(12) United States Patent
Ahmed et al.

(10) Patent No.: US 11,288,155 B2
(45) Date of Patent: *Mar. 29, 2022

(54) IDENTIFYING ANOMALIES IN DATA DURING DATA OUTAGE

(71) Applicant: International Business Machines Corporation, Armonk, NY (US)

(72) Inventors: Mansoor Ahmed, Bangalore (IN); Sattwati Kundu, Bangalore (IN); Nair Raghunath Eledath, Bangalore (IN); Geetha Adinarayan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/128,016

(22) Filed: Dec. 19, 2020

(65) Prior Publication Data
US 2021/0216423 A1 Jul. 15, 2021

Related U.S. Application Data

(63) Continuation of application No. 16/739,496, filed on Jan. 10, 2020.

(51) Int. Cl.
*G06F 11/30* (2006.01)
*G06N 20/00* (2019.01)
(Continued)

(52) U.S. Cl.
CPC ...... *G06F 11/3006* (2013.01); *G06F 11/0757* (2013.01); *G06F 11/3089* (2013.01);
(Continued)

(58) Field of Classification Search
CPC ............. G06F 11/3006; G06F 11/3089; G06F 11/3447; G06F 11/0757; G06F 11/3055;
(Continued)

(56) References Cited

U.S. PATENT DOCUMENTS

| | | |
|---|---|---|
| 7,869,967 B2 | 1/2011 | Marvasti et al. |
| 8,676,964 B2 | 3/2014 | Gopalan et al. |

(Continued)

OTHER PUBLICATIONS

Alvira Swalin, "How to Handle Missing Data," https://towardsdatascience.com/how-to-handle-missing-data-8646b18db0d4, Jan. 30, 2018, pp. 1-9.
(Continued)

*Primary Examiner* — Yolanda L Wilson
(74) *Attorney, Agent, or Firm* — Robert A. Voigt, Jr.; Shackelford, Bowen, McKinley & Norton, LLP (57) ABSTRACT

A computer-implemented method, system and computer program product for identifying anomalies in data during a data outage. An anomaly detection model is built using data received from a sensor at a characterized granularity. Once a period of service occurs following a data outage, a quantum of missing data during the data outage is identified using predictive modeling if the data during the data outage is not available at the granularity in which the anomaly detection model is built. The identified quantum of missing data is retrofitted into a predicted pattern during the data outage and the analytics are then re-run on the retrofitted quantum of missing data in the predicted pattern to identify anomalies during the data outage. In this manner, anomalies in data, such as data from sensor readings, can be identified during the data outage thereby enabling the model to provide more accurate predictions of anomalies occurring during the data outage.

7 Claims, 8 Drawing Sheets

(51) Int. Cl.
*G06F 11/32* (2006.01)
*G06F 11/07* (2006.01)

(52) U.S. Cl.
CPC .......... *G06F 11/323* (2013.01); *G06F 11/324* (2013.01); *G06N 20/00* (2019.01)

(58) Field of Classification Search
CPC ...... G06F 11/34; G06F 11/07; G06F 11/3466; G06N 20/00
See application file for complete search history.

(56) References Cited

U.S. PATENT DOCUMENTS

| | | | |
|---|---|---|---|
| 10,873,726 B1* | 12/2020 | Maldonado | ............ H04N 7/181 |
| 2007/0150949 A1 | 6/2007 | Futamura et al. | |
| 2010/0299118 A1 | 11/2010 | Sharma et al. | |
| 2012/0166142 A1* | 6/2012 | Maeda | ............... G05B 23/0227 702/185 |
| 2012/0259547 A1 | 10/2012 | Morlock et al. | |
| 2013/0085715 A1 | 4/2013 | Lakshminarayan et al. | |
| 2014/0358828 A1 | 12/2014 | Phillipps et al. | |
| 2017/0118099 A1 | 4/2017 | Huang | |
| 2018/0096261 A1 | 4/2018 | Chu et al. | |
| 2018/0136994 A1* | 5/2018 | Toledano | .............. G06F 11/322 |
| 2018/0268264 A1 | 9/2018 | Marwah et al. | |
| 2019/0138423 A1* | 5/2019 | Agerstam | ........... G06F 11/3447 |
| 2019/0258564 A1 | 8/2019 | Parthasarathy et al. | |
| 2019/0286725 A1* | 9/2019 | Gawlick | ............. G06F 16/2264 |
| 2020/0233774 A1* | 7/2020 | Toledano | .............. G06F 16/288 |
| 2020/0366586 A1 | 11/2020 | Smarda et al. | |
| 2021/0065030 A1* | 3/2021 | Tagra | .................. G06F 11/1402 |

OTHER PUBLICATIONS

Mr. Spoc, "Outage Prevention Using Machine Learning," https://mr.spoc.pl/outage-prevention-using-machine-learning/?lang=en, Mar. 7, 2017, pp. 1-6.

Office Action for U.S. Appl. No. 16/739,496 dated Jul. 9, 2021, pp. 1-18.

List of IBM Patents or Patent Applications Treated as Related, Jan. 14, 2021, pp. 1-2.

* cited by examiner

IDENTIFYING ANOMALIES IN DATA DURING DATA OUTAGE

TECHNICAL FIELD

The present invention relates generally to anomaly detection, and more particularly to identifying anomalies in data, such as data from sensor readings, during a data outage.

BACKGROUND

Anomaly detection is the process of identifying unexpected items or events in data sets, which differ from the norm.

Three broad categories of anomaly detection techniques exist. Unsupervised anomaly detection techniques detect anomalies in an unlabeled test data set under the assumption that the majority of the instances in the data set are normal by looking for instances that seem to least fit the remainder of the data set. Supervised anomaly detection techniques require a data set that has been labeled as "normal" and "abnormal" and involves training a classifier. Semi-supervised anomaly detection techniques construct a model representing normal behavior from a given normal training data set, and then test the likelihood of a test instance to be generated by the learnt model using machine learning/artificial intelligence so as to form a prediction of an anomaly.

Such machine learning/artificial intelligence models ("anomaly detection models") may be directly impacted on the quality of their prediction of an anomaly due to data outages, such as a network outage or the unavailability of a cloud solution. For instance, when there is a data outage, the anomaly detection model may no longer be able to determine the pattern of the data during the data outage, or alternatively, the pattern of the data during the data outage may be mispresented. In either case, the prediction of an anomaly made by the anomaly detection model will now be less accurate. For example, after connectivity is restored, the anomaly detection model may now receive aggregated energy usage data from the gateway during the data outage (e.g, eight hours). However, the pattern of data during the data outage is lost and, as a result, the anomalies that occurred during the data outage will be precluded from being identified.

Furthermore, when connectivity is restored after a duration of time (e.g., hours, days, weeks), a surge of data may be received which may also impact the quality of the prediction made by the anomaly detection model, such as falsely identifying an anomaly after connectively is restored.

SUMMARY in one embodiment of the present invention, a computer-implemented method for identifying anomalies in data during a data outage comprises building an anomaly detection model using data received from a sensor at a characterized granularity. The method further comprises marking the sensor as being in a first state in response to the data not being received from the sensor at a required frequency, where a period of time that the data is not being received from the sensor at the required frequency corresponds to a period of the data outage. The method additionally comprises marking the sensor as being in a second state after marking the sensor as being in the first state in response to the data being received from the sensor at the required frequency after the data not being received from the sensor at the required frequency, where a period of time that the data is being received from the sensor at the required frequency corresponds to a period of service following the data outage. Furthermore, the method comprises identifying a quantum of missing data during the data outage using predictive modeling in response to data during the data outage not being available at a granularity in which the anomaly detection model is built. Additionally, the method comprises retrofitting the identified quantum of missing data into a predicted pattern during the data outage. In addition, the method comprises re-running analytics on the retrofitted quantum of missing data in the predicted pattern to identify anomalies during the data outage.

Other forms of the embodiment of the computer-implemented method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a computer-implemented method, system and computer program product for identifying anomalies in data during a data outage. In one embodiment of the present invention, an anomaly detection model is built using data received from a sensor at a characterized granularity. An object of a sensor is marked in a first state e.g., "not available") if the data is not being received from the sensor at the required frequency. When such an event occurs, a data outage is said to occur. When data is subsequently received from the sensor at the required frequency, the object of the sensor is then marked in a second state (e.g., "available"). When such an event occurs (sensor becomes available again), a period of service is said to occur following the data outage. Once the period of service occurs, a quantum of missing data during the data outage is identified using predictive modeling if the data during the data outage is not available at the granularity in which the anomaly detection model is built. The identified quantum of missing data is retrofitted into a predicted pattern during the data outage and the analytics are then re-run on the retrofitted quantum of missing data in the predicted pattern to identify anomalies during the data outage. In this manner, anomalies in data, such as data from sensor readings, can be identified during the data outage thereby enabling the anomaly detection model to provide more accurate predictions of anomalies occurring during the data outage. Furthermore, the false detection of anomalies in the surge of data after the sensor becomes available again is avoided.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
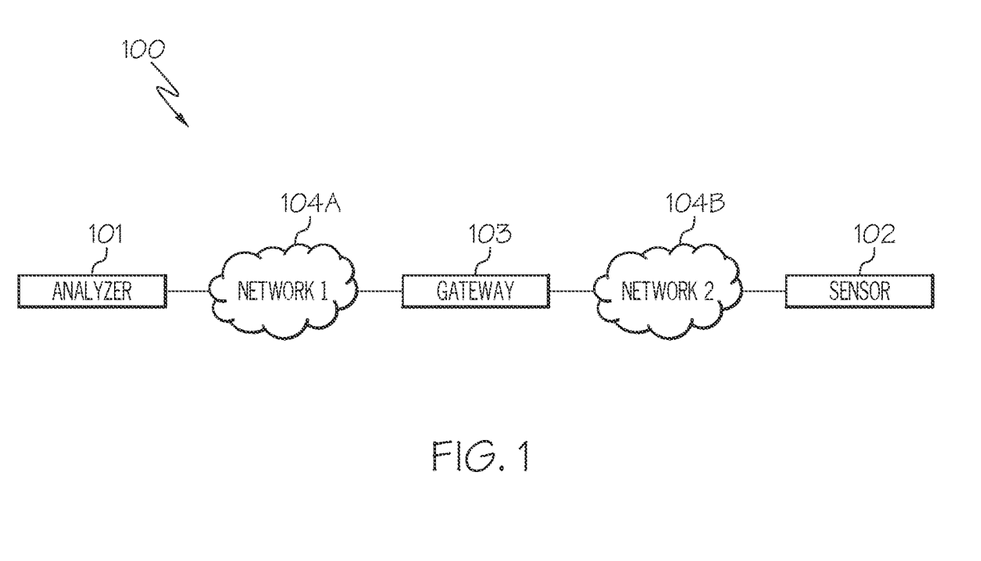
FIG. 1 illustrates a communication system for practicing the principles of the present invention in accordance with an embodiment of the present invention.

Referring now to the Figures in detail, FIG. 1 illustrates a communication system 100 for identifying anomalies in data, such as data from sensor readings, during a data outage thereby enabling the anomaly detection model to provide more accurate predictions of anomalies occurring during the data outage. In one embodiment, system 100 includes an analyzer 101 for identifying anomalies in data, such as data from sensor readings, during a data outage. Such data may be received from a sensor 102 via a gateway 103. A "gateway" 103, as used herein, refers to any networking device that allows data to flow, such as from one network 104A (identified as "Network 1") to another network 104B (identified as "Network 2") as shown in FIG. 1. Networks 104A-104B may collectively or individually be referred to as networks 104 or network 104, respectively. While FIG. 1 illustrates the utilization of multiple networks 104, system 100 is not to be limited in scope in such a manner. Instead, system 100 may include a single network 104 interconnecting the components discussed above.

As discussed above, analyzer 101 is configured to identify anomalies in data, such as data from sensor readings, during a data outage thereby enabling the anomaly detection model to provide more accurate predictions of anomalies occurring during the data outage. In one embodiment, analyzer 101 identifies anomalies in the data during the data outage by using predictive modeling to identify the pattern of data (or quantum of missing data) during the data outage if the data during the data outage is not available at the granularity in which the anomaly detection model was built. Such a pattern of data is then analyzed to determine if an anomaly occurred during the data outage. If, however, the data during the data outage is available at the granularity in which the anomaly detection model was built, such as being available by gateway 103, then such data is retrofitted into a predicted pattern during the outage period and analyzed to determine if an anomaly occurred during the data outage. A further description of these and other aspects of analyzer 101 is provided further below in connection with FIGS. 3A-3C and 4-7. A description of the hardware configuration of analyzer 101 is provided below in connection with FIG. 2.

Sensor 102, as used herein, refers to a device whose purpose is to detect events or changes and send the information to other electronics, such as analyzer 101.

Networks 104 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 is not to be limited in scope to any one particular network architecture. System 100 may include any number of analyzers 101, sensors 102, gateways 103 and networks 104.

Figure 2:
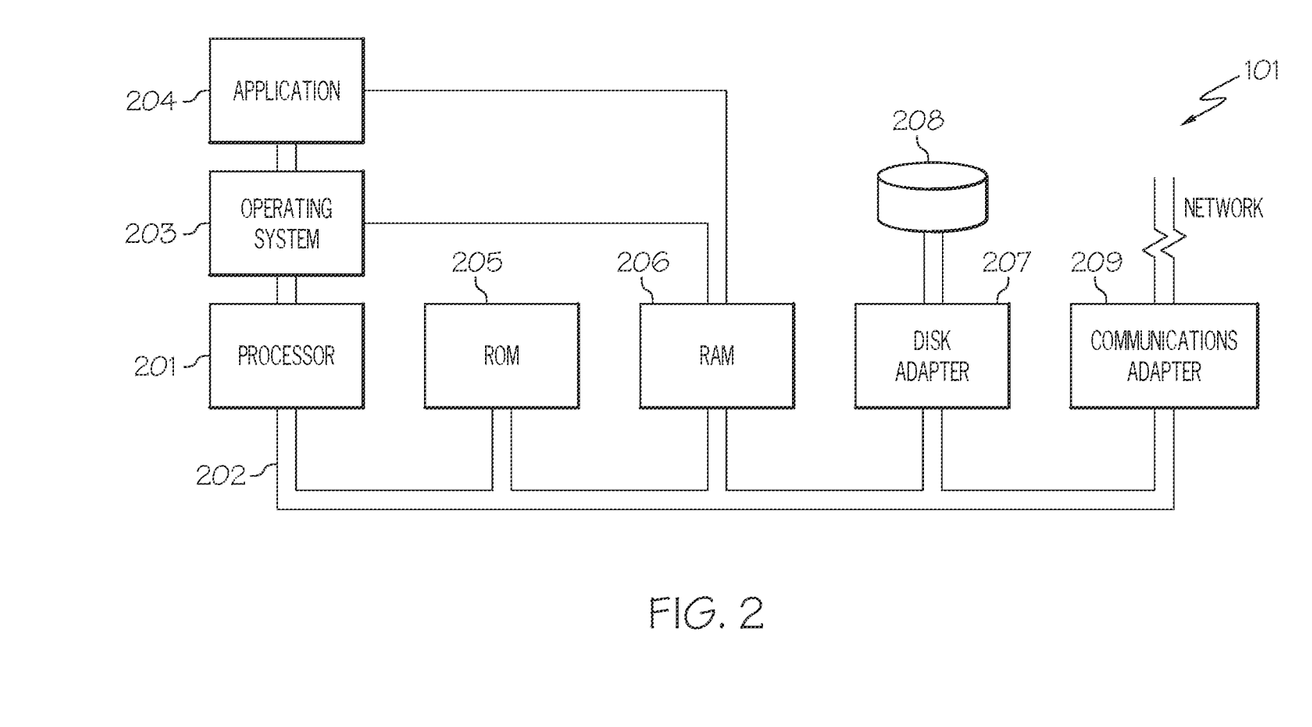
FIG. 2 illustrates an embodiment of the present invention of a hardware configuration of the analyzer which is representative of a hardware environment for practicing the present invention.

Referring now to FIG. 2, FIG. 2 illustrates a hardware configuration of analyzer 101 (FIG. 1) which is representative of a hardware environment for practicing the present invention.

Analyzer 101 has a processor 201 connected to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for identifying anomalies in data, such as data from sensor readings, during a data outage, as discussed further below in connection with FIGS. 3A-3C and 4-7.

Referring again to FIG. 2, read-only memory ("ROM") 205 is connected to system bus 202 and includes a basic input/output system ("BIOS") that controls certain basic functions of analyzer 101. Random access memory ("RAM") 206 and disk adapter 207 are also connected to system bus 202. It should be noted that software components including operating system 203 and application 204 may be loaded into RAM 206, which may be analyzer's 101 main memory for execution. Disk adapter 207 may be an integrated drive electronics ("IDE") adapter that communicates with a disk unit 208, e.g., disk drive. It is noted that the program for identifying anomalies in data, such as data from sensor readings, during a data outage, as discussed further below in connection with FIGS. 3A-3C and 4-7, may reside in disk unit 208 or in application 204.

Analyzer 101 may further include a communications adapter 209 connected to bus 202. Communications adapter 209 interconnects bus 202 with an outside network (e.g., network 104 of FIG. 1) thereby allowing analyzer 101 to communicate with sensor 102 and gateway 103.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, anomaly detection is the process of identifying unexpected items or events in data sets, which differ from the norm. Three broad categories of anomaly detection techniques exist. Unsupervised anomaly detection techniques detect anomalies in an unlabeled test data set under the assumption that the majority of the instances in the data set are normal by looking for instances that seem to least fit the remainder of the data set. Supervised anomaly detection techniques require a data set that has been labeled as "normal" and "abnormal" and involves training a classifier. Semi-supervised anomaly detection techniques construct a model representing normal behavior from a given normal training data set, and then test the likelihood of a test instance to be generated by the learnt model using machine learning/artificial intelligence so as to form a prediction of an anomaly. Such machine learning/artificial intelligence models ("anomaly detection models") may be directly impacted on the quality of their prediction of an anomaly due to data outages, such as a network outage or the unavailability of a cloud solution. For instance, when there is a data outage, the anomaly detection model may no longer be able to determine the pattern of the data during the data outage, or alternatively, the pattern of the data during the data outage may be mispresented. In either case, the prediction of an anomaly made by the anomaly detection model will now be less accurate. For example, after connectivity is restored, the anomaly detection model may now receive aggregated energy usage data from the gateway during the data outage (e.g., eight hours). However, the pattern of data (quantum of missing data) during the data outage is lost and, as a result, the anomalies that occurred during the data outage will be precluded from being identified. Furthermore, when connectivity is restored after a duration of time (e.g., hours, days, weeks), a surge of data may be received which may also impact the quality of the prediction made by the anomaly detection model, such as falsely identifying an anomaly after connectively is restored. As a result, there is not currently a means for accurately detecting anomalies in data, such as data from sensor readings, by an anomaly detection model during a data outage and upon restoration of connectivity.

Figure 3A:
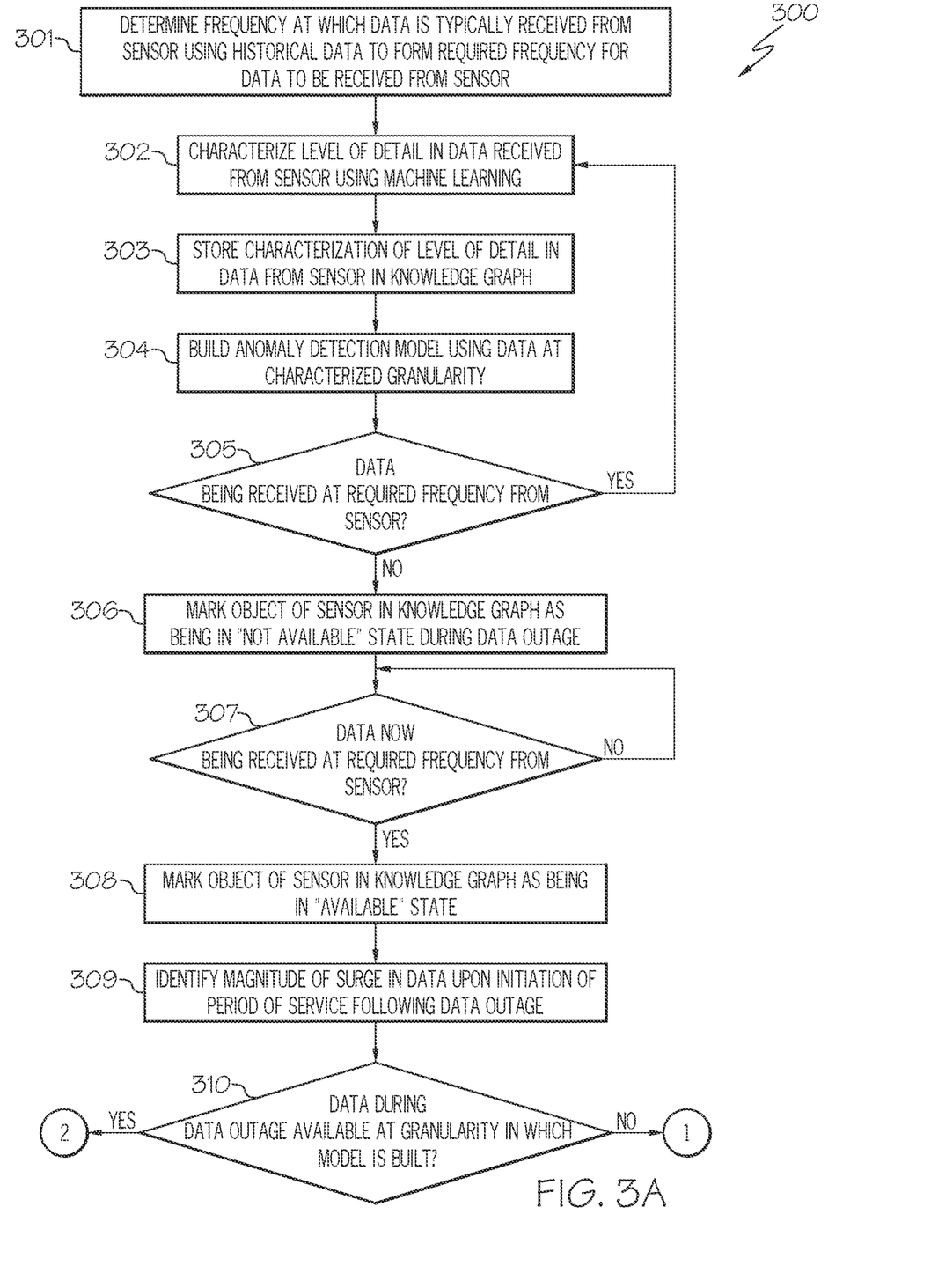
FIGS. 3A-3C are a flowchart of a method for identifying anomalies in data during the data outage in accordance with an embodiment of the present invention.
Figure 3B:
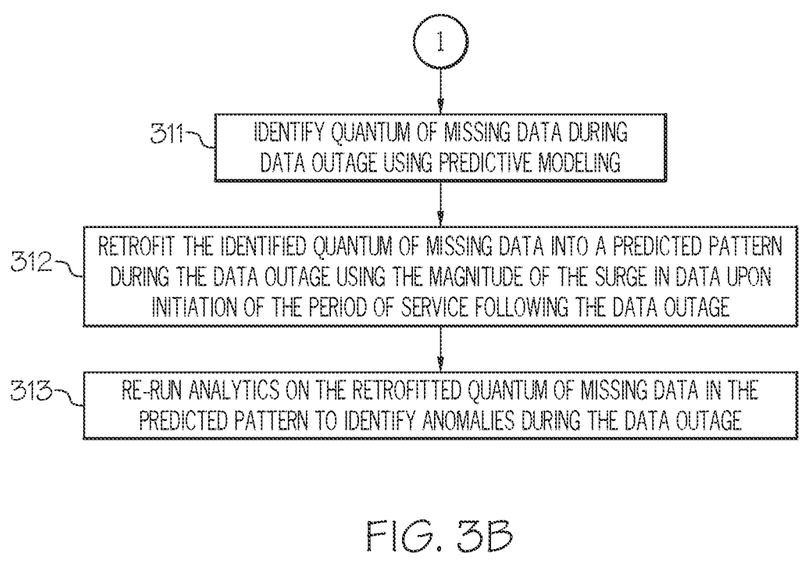
Figure 3C:
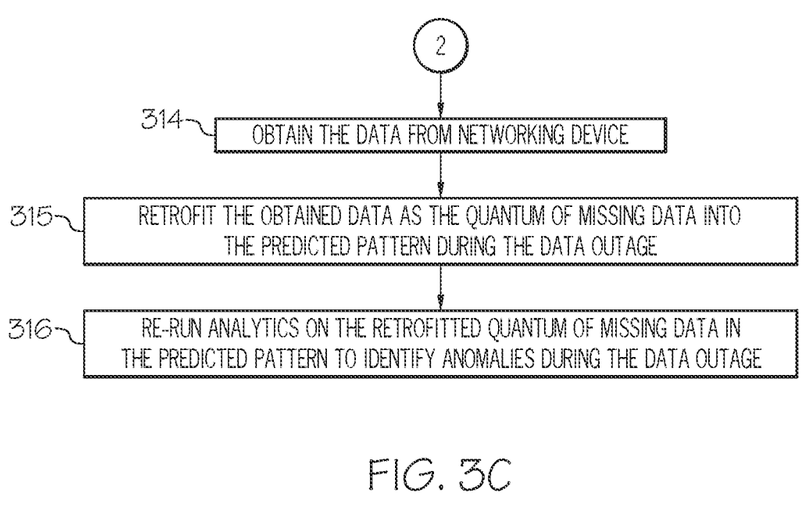
Figure 4:
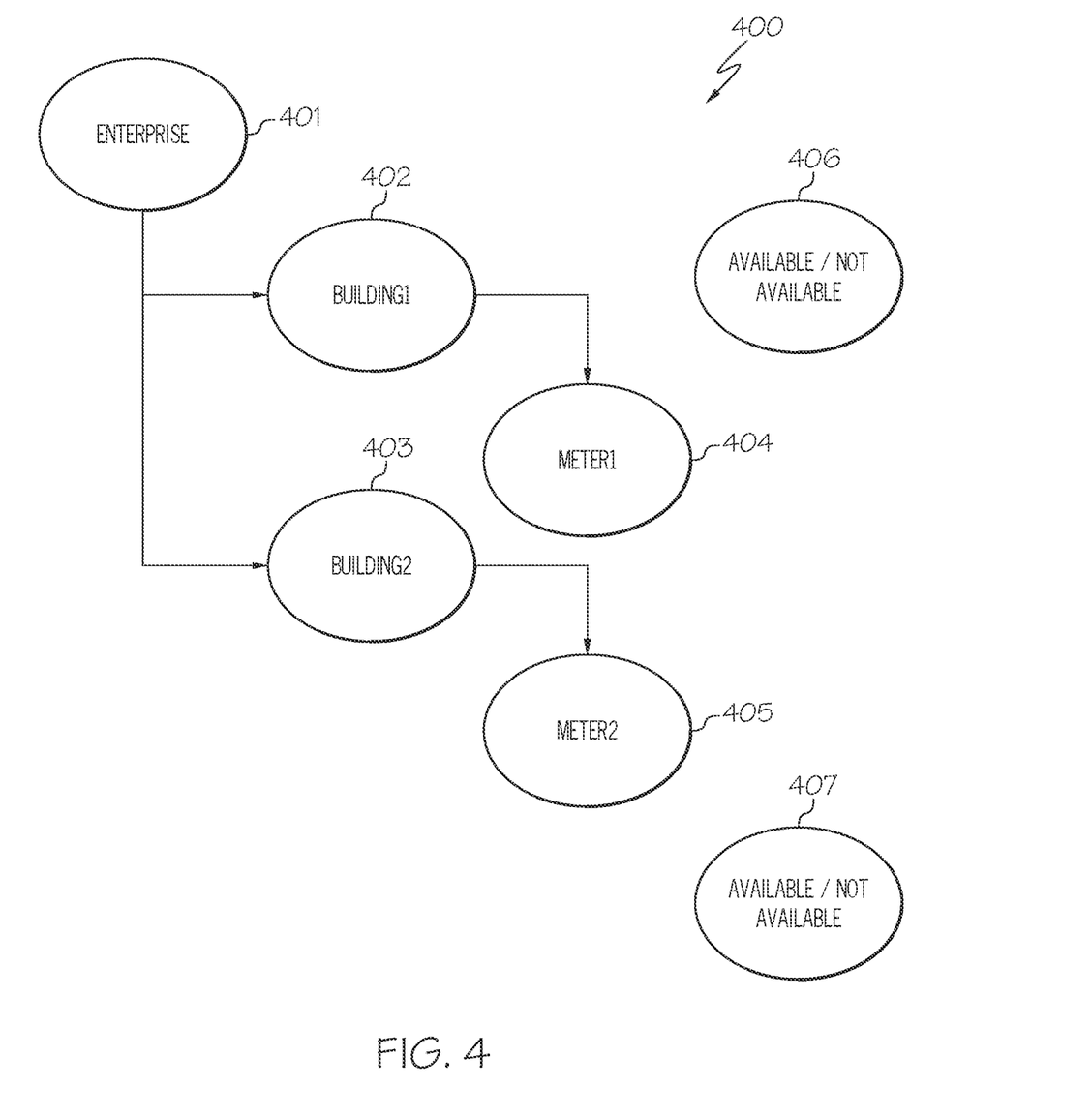
FIG. 4 illustrates a knowledge graph in accordance with an embodiment of the present invention.
Figure 5:
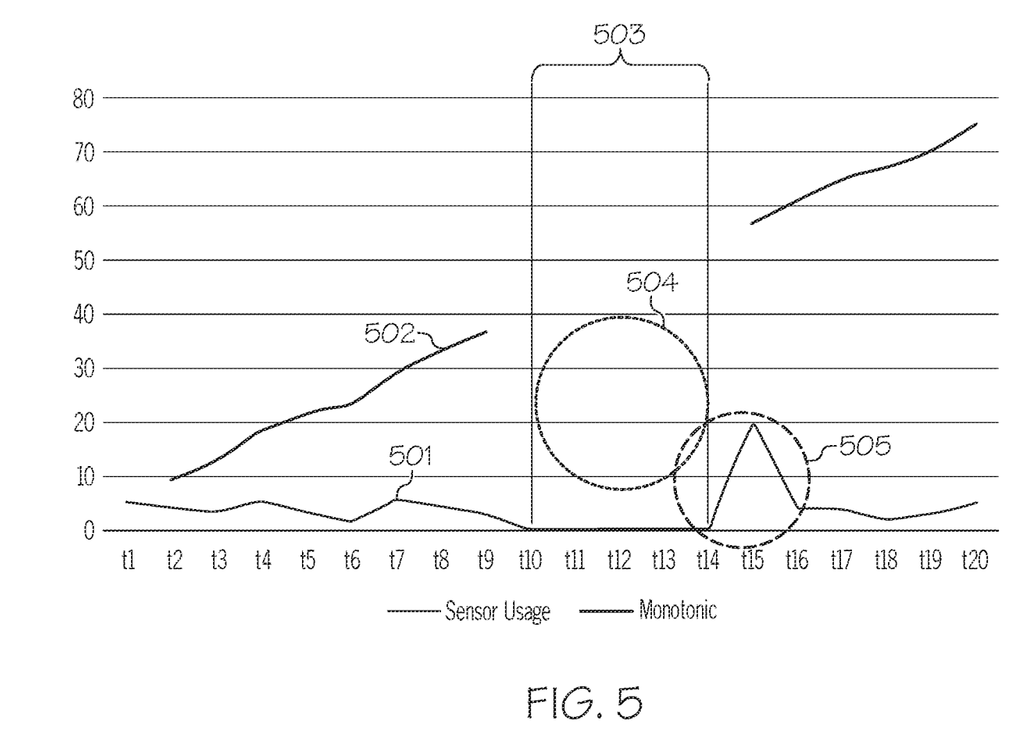
FIG. 5 illustrates a lack of usage data during the data outage and a surge of data upon initiation of the period of service following the data outage that causes a false detection of an anomaly in accordance with an embodiment of the present invention.
Figure 6:
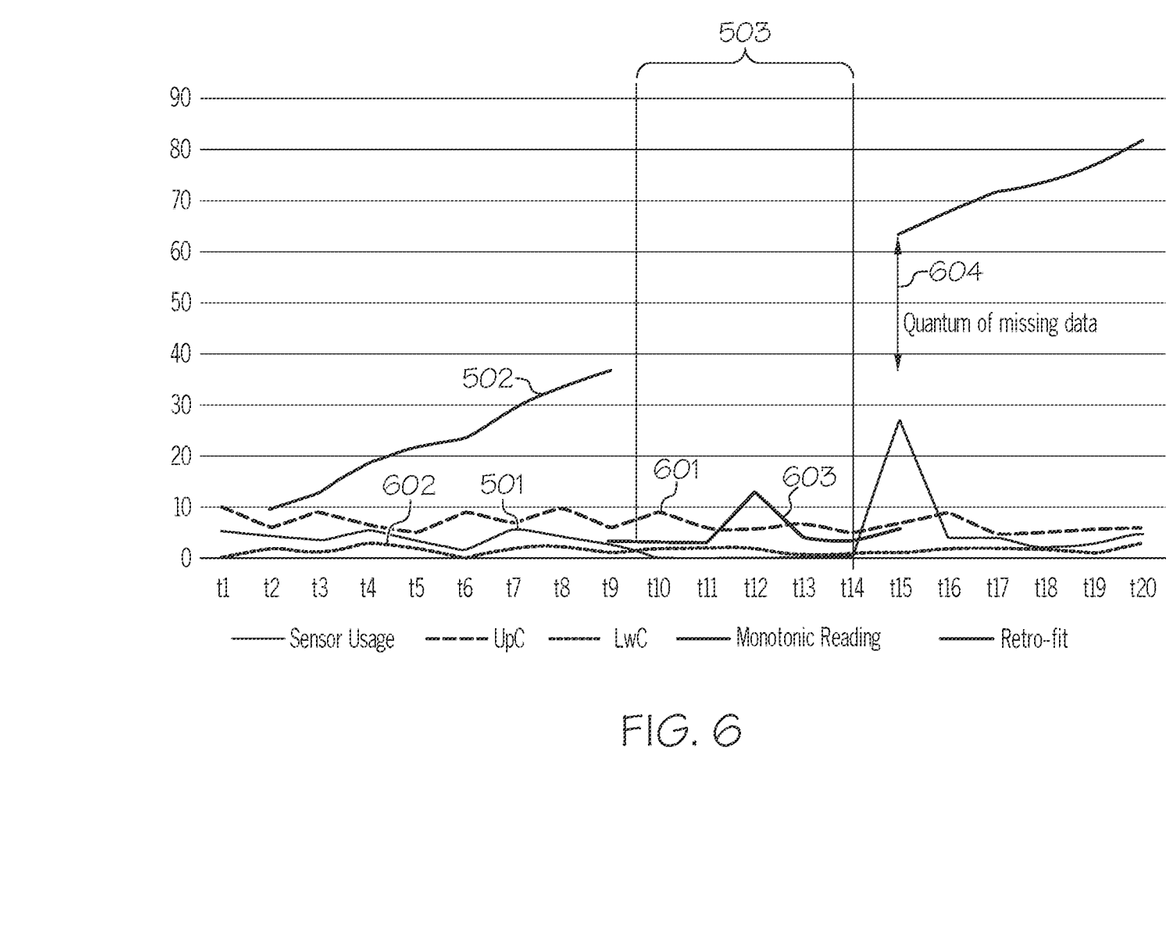
FIG. 6 illustrates retrofitting a quantum of missing data during the data outage period using predictive modeling into a predicted pattern in accordance with an embodiment of the present invention.
Figure 7:
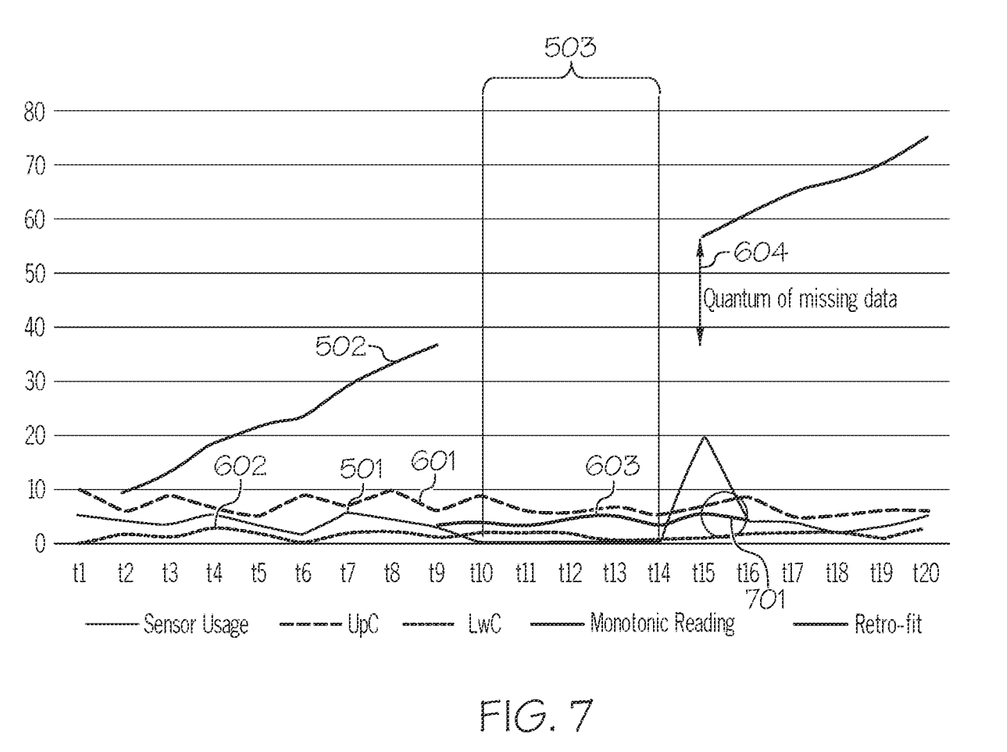
FIG. 7 illustrates retrofitting the quantum of missing data into the predicted pattern that results in the avoidance of a false detection of an anomaly upon resumption of receiving data from the sensor in accordance with an embodiment of the present invention.

The embodiments of the present invention provide a means for identifying anomalies in data, such as data from sensor readings, during the data outage thereby enabling the anomaly detection model to provide more accurate predictions of anomalies occurring during the data outage as well as precluding the false detection of anomalies upon restoration of connectivity as discussed below in connection with FIGS. 3A-3C and 4-7. FIGS. 3A-3C are a flowchart of a method for identifying anomalies in data during the data outage. FIG. 4 illustrates a knowledge graph. FIG. 5 illustrates a lack of usage data during the data outage and a surge of data upon initiation of a period of service following the data outage that causes a false detection of an anomaly. FIG. 6 illustrates retrofitting a quantum of missing data during the data outage period using predictive modeling into a predicted pattern. FIG. 7 illustrates retrofitting the quantum of missing data into the predicted pattern that results in the avoidance of a false detection of an anomaly upon resumption of receiving data from the sensor.

As stated above, FIGS. 3A-3C are a flowchart of a method 300 for identifying anomalies in data during the data outage in accordance with an embodiment of the present invention.

Referring to FIG. 3A, in conjunction with FIGS. 1-2, in step 301, analyzer 101 determines the frequency at which data is typically received from sensor 102 using historical data. In one embodiment, such historical data is acquired by analyzer 101 monitoring the time durations between receiving data from sensor 102. Such information may be used to determine whether a data outage has occurred. For example, analyzer 101 may determine that data is typically received from sensor 102 every twenty minutes. If data is not received by analyzer 101 within a user-designated amount of time (e.g., six times the average amount of time that data is typically received from sensor 102), then analyzer 101 may conclude that a data outage has occurred.

In one embodiment, the frequency at which data needs to be received by analyzer 101 from sensor 102 in order to conclude that a data outage has not occurred corresponds to such a user-designated amount of time. For example, if data is typically received from sensor 102 every twenty minutes, and the user-designated amount of time to conclude that a data outage has occurred is six times such an amount of time, then the user-designated amount of time corresponds to 120 minutes (2 hours). Such an amount of time is referred to herein as the "required frequency" corresponding to the required rate of time at which data needs to be received from sensor 102 in order for analyzer 101 to conclude that service is operable and that a data outage has not occurred. If data has not been received from sensor 102 at the required frequency, then a data outage is said to have occurred.

In step 302, analyzer 101 characterizes the level of detail in the data received from sensor 102 using machine learning. Such a level of detail, as used herein, refers to the "granularity." In one embodiment, the level of detail is determined by identifying the dimensions within the data, such as different geographical hierarchies (e.g., country, state, city, post code). Other examples include different time/date dimensions (e.g., seconds, minutes, hours, days, weeks, months, years) and product warehouse dimensions (e.g., single product, single product attribute, total number of products, monthly orders). In one embodiment, machine learning algorithms build a mathematical model based on sample data (known as "training data") consisting of different dimensions within the data. Such a mathematical model is used to make predictions or decisions as to the level of detail (granularity) of the data based on the training data. As a result, a mathematical model may be used by analyzer 101 to characterize the level of data in the data received from sensor 102.

In step 303, analyzer 101 stores the characterization of the level of detail in the data from sensor 102 in a knowledge graph as shown in FIG. 4. Referring to FIG. 4, FIG. 4 illustrates a knowledge graph 400 in accordance with an embodiment of the present invention.

A "knowledge graph" 400, as used herein, refers to an ontology in a graphical form that encompasses a representation, formal naming and definition of categories, properties and relations between concepts, data and entities. For example, as shown in FIG. 4, an entity is represented by object 401 ("enterprise") that includes two objects 402, 403 ("Building1" and "Building2," respectively), where object 402 is associated with sensor 404 ("Meter1") and object 403 is associated with sensor 405 ("Meter2"). For example, object 404 may represent a sensor that is used in a building corresponding to "Building1" of an enterprise and object 405 may represent a sensor that is used in a building corresponding to "Building2" of the enterprise.

Furthermore, knowledge graph 400 may include objects that indicate whether the sensors are available or not available to provide data to analyzer 101. For example, object 406 indicates whether sensor 404 is available or not available to provide data to analyzer 101. In another example, object 407 indicates whether sensor 405 is available or not available to provide data to analyzer 101. An indication of "available," as used herein, refers to the sensor being able to detect events or changes in its environment and to send the detected information to other electronics, such as analyzer 101, during a period of time referred to herein as the "period of service." A "period of service," as used herein, refers to a period of time in which service is operable for sensor 102 to detect events or changes in its environment and to send the information to other electronics, such as analyzer 101. In other words, a period of service is when there is not a data outage. On the other hand, an indication of "not available,"

as used herein, refers to sensor 102 not being able to detect events or changes in its environment due to a data outage.

The information stored in knowledge graph 400 may be used to build an anomaly detection model as well as to determine if data is available at the granularity in which the anomaly detection model is built during a data outage as discussed further below.

Returning to FIG. 3A, in conjunction with FIGS. 1-2 and 4, in step 304, analyzer 101 builds an anomaly detection model using the data at the characterized granularity. In one embodiment, such a model is built using the information stored in knowledge graph 400. In one embodiment, the information stored in knowledge graph 400 is used to represent a normal training data set. The anomaly detection model is then constructed representing the normal behavior from such a given normal training data set. In one embodiment, a machine learning algorithm (e.g., linear regression, logistic regression, decision tree, naïve Bayes, k-nearest neighbors) builds the anomaly detection model based on the normal training data set thereby enabling the anomaly detection model to make predictions regarding anomalies in the data, including during a data outage as discussed further below.

In step 305, a determination is made by analyzer 101 as to whether the data is being received from sensor 102 at the required frequency (e.g., data being received within 2 hours since last transmission of data). Such a required frequency may correspond to a "threshold value." If the data is being received from sensor 102 at the required frequency, then analyzer 101 continues to characterize the level of detail in the data received from sensor 102 using machine learning in step 302.

If, however, the data is not being received from sensor 102 at the required frequency, then, in step 306, analyzer 101 marks the object of the sensor (e.g., object 404) as being in the "not available" state (see, e.g., object 406). As previously discussed, when the data is not being received from sensor 102 at the required frequency, a data outage is said to have occurred. Furthermore, as previously discussed, marking the object of the sensor (e.g., object 404) as being in the "not available" state (see, e.g., object 406) indicates that sensor 102 is not being able to detect events or changes in its environment due to a data outage. In one embodiment, the period of time that data is not being received from sensor 102 at the required frequency corresponds to the period of the data outage.

In step 307, a determination is made by analyzer 101 as to whether data is now being received at the required frequency from sensor 102. If data is still not being received at the required frequency from sensor 102, then analyzer 101 continues to determine whether data is now being received at the required frequency from sensor 102 in step 307.

If, however, data is now being received at the required frequency from sensor 102, then, in step 308, analyzer 101 marks the object of the sensor (e.g., object 404) as being in the "available" state (see, e.g., object 406). As previously discussed, marking the object of the sensor (e.g., object 404) as being in the "available" state indicates that the sensor is able to detect events or changes in its environment and to send the detected information to other electronics, such as analyzer 101, during a period of time referred to as the "period of service" as opposed to a data outage. In one embodiment, a period of time that the data is now being received from sensor 102 at the required frequency corresponds to a period of service following the data outage.

In step 309, analyzer 101 identifies the magnitude of the surge in data upon initiation of the period of service following the data outage. For example, upon initiation of the period of service, a surge of data from sensor 102 may be received by analyzer 101 as shown in FIG. 5.

FIG. 5 illustrates a lack of usage data during the data outage and a surge of data upon initiation of the period of service following the data outage that causes a false detection of an anomaly in accordance with an embodiment of the present invention.

Referring to FIG. 5, FIG. 5 is a graph showing the energy meter usage (represented in kilowatts) (shown on y-axis) versus time (shown on x-axis) for sensor usage 501. The anomaly detection model uses such sensor data (sensor usage 501) as an input and outputs a prediction as to whether an anomaly has occurred. In one embodiment, in connection with generating such a prediction, analyzer 101 utilizes a function of the sensor usage 501 that is monotonic that is also shown in FIG. 5 (see 502).

As further shown in FIG. 5, during a data outage 503 (between time t10 and time t14), there is no visibility in the usage pattern (see 504) and there is an unexpected jump (spike or surge) when sensor data becomes available again (see 505) leading to a possible false detection of an anomaly. The magnitude of such a surge is identified and utilized to ensure that false detection of anomalies in the surge of data after sensor 102 becomes available again is avoided as discussed further below.

Furthermore, as discussed further below, by being able to identify a pattern of data (quantum of missing data) during the data outage, such missing data is retrofitted into a predicted pattern during the data outage and analytics are re-run on the retrofitted data in the predicted pattern to identify anomalies in the data outage more accurately as discussed further below.

Returning to FIG. 3A, in conjunction with FIGS. 1-2 and 4-5, in step 310, a determination is made by analyzer 101 as to whether data during the data outage is available at the granularity in which the anomaly detection model was built. For example, a networking device, such as gateway 103 may possess the data (e.g., energy meter usage data) from sensor 102 during the data outage (period of time shown as element 503 in FIG. 5). In one embodiment, the connection between sensor 102 and gateway 103 may be active; whereas, the connection between gateway 103 and analyzer 101 may be inactive thereby resulting in a data outage from the perspective of analyzer 101. In such a situation, gateway 103 may maintain a copy of the data sent from sensor 102 to analyzer 101. Upon initiation of service to analyzer 101, analyzer 101 may attempt to obtain the sensor data sent by sensor 102 during the data outage, such as from gateway 103, if the data was stored at the granularity (level of detail) in which the anomaly detection model was built as discussed further below.

If, however, data during the data outage is not available at the granularity in which the anomaly detection model was built, then predictive modeling is used to identify the pattern of data (quantum of missing data) during the data outage as discussed below.

Referring now to FIG. 3B, in conjunction with FIGS. 1-2 and 4-5, if data during the data outage is not available at the granularity (level of detail) in which the anomaly detection model was built, then, in step 311, analyzer 101 identifies a quantum of missing data during the data outage using predictive modeling.

Predictive modeling, as used herein, refers to using statistics to predict outcomes, such as a pattern of data (quantum of missing data). In one embodiment, a predictive model is constructed by utilizing the information stored in knowledge graph 400, including the historical values and patterns of the sensor data. A parametric predictive modeling approach (e.g., logistic regression, linear discriminant analysis, perceptron, naïve Bayes, simple neural networks) or a non-parametric predictive modeling approach (e.g., decision trees, k-nearest neighbors) is identified to use. The data from knowledge graph 400 is then preprocessed into a form suitable for the chosen modeling algorithm. A subset of the data is then specified to be used for training the predictive model. The model parameters are then trained or estimated from the training data set. Model performance or goodness-of-fit tests are conducted to check model accuracy. After validating the predictive modeling accuracy on data not being used for calibrating the model, the model is then used for prediction (predicting pattern of data during the data outage) if its performance is satisfactory.

In one embodiment, a classifier is also used to determine the probability of a set of data belonging to another set, such as determining the probability of data belonging to the set of data that occurred during the data outage.

In one embodiment, the upper and lower bounds of the confidence level are computed for the identified pattern of data (quantum of missing data) during the data outage. A "confidence interval," as used herein, refers to a type of interval estimate, computed from the statistics of the observed data, that might contain the true value of an unknown data element (e.g., energy meter usage data). Such a confidence interval includes an upper bound and a lower bound. For example, a 95% confidence interval implies that one is 95% confident that the true population (data values that occurred during the data outage) lies between the lower bound and the upper bound. In one embodiment, the upper and lower bounds of the confidence interval are calculated based on the historical data pattern of sensor 102.

In step 312, analyzer 101 retrofits the identified quantum of missing data into a predicted pattern during the outage period using the magnitude (value) of the surge in data upon initiation of the period of service following the data outage as shown in FIG. 6.

In step 313, analyzer 101 re-runs analytics on the retrofitted quantum of missing data in the predicted pattern to identify anomalies during the data outage as shown in FIG. 6.

Referring now to FIG. 6, FIG. 6 illustrates retrofitting a quantum of missing data during the data outage period using predictive modeling into a predicted pattern in accordance with an embodiment of the present invention.

As shown in FIG. 6, FIG. 6 includes the graph of FIG. 5 showing the energy meter usage (represented in kilowatts) versus time (shown on x-axis) for sensor usage 501. Furthermore, as shown in FIG. 6, the upper bound 601 and lower bound 602 of the confidence interval for the identified pattern of data (quantum of missing data) during the data outage are computed. In one embodiment, the upper and lower bounds 601, 602 of the confidence interval are computed based on the historical data pattern of sensor 102. For example, the historical data pattern may indicate a range of energy meter usage between 1 and 10 kilowatts for data typically received during such a time period (e.g., between time t1 and time t20).

Furthermore, as shown in FIG. 6, the missing data (identified pattern of data) is retrofitted (see line 603) into a predicted pattern to predict anomalies during the data outage. Such missing data corresponds to the quantum of missing data 604. In one embodiment, the magnitude (value) of the surge is utilized to determine the magnitude of the quantum of missing data 604 to be retrofitted into the predicted pattern, such as by providing an approximate amount of data that was to be received during the data outage. By using the magnitude of the surge, a more accurate prediction of the missing data to be retrofitted into the predicted pattern may be provided. In this manner, anomalies in data, such as data from sensor readings, can be identified during the data outage thereby enabling the anomaly detection model to provide more accurate predictions of anomalies occurring during the data outage.

Referring now to FIG. 7, FIG. 7 illustrates retrofitting the quantum of missing data into the predicted pattern that results in the avoidance of a false detection of an anomaly upon resumption of receiving data from the sensor in accordance with an embodiment of the present invention.

As shown in FIG. 7, FIG. 7 includes the graph of FIG. 6 showing the energy meter usage (represented in kilowatts) versus time (shown on x-axis) for sensor usage 501. Furthermore, as shown in FIG. 7, missing data (identified pattern of data) is retrofitted (see line 701) into the predictive pattern between time t15 and time t16 to avoid falsely detecting any anomaly on data resumption. That is, the missing data is retrofitted into the predictive pattern so as to avoid falsely detecting an anomaly, such as in the surge of data that is received after the resumption of receiving data from sensor 102 following the data outage. As shown in FIG. 7, the "spike" of data has been replaced with a retrofitted line (see lines 603 and 701) that is smoother and less erratic and more representative with how data would be received during the data outage if data could have been received during such a time period. In this manner, the false detection of anomalies in the surge of data after sensor 102 becomes available again is avoided.

Furthermore, in one embodiment, by retrofitting the quantum of missing data 604 into the predictive pattern between time t15 and time t16 (see line 700, retrofit line 603 becomes smoother and more representative with how data would be received during the data outage if data could have been received during such a time period.

Referring now to FIG. 3C, in conjunction with FIGS. 1-2 and 4-7, alternatively, if, however, data during the data outage is available at the granularity (level of detail) in which the anomaly detection model was built, then, in step 314, analyzer 101 obtains the data, such as from the networking device (e.g., gateway 103).

In step 315, analyzer 101 retrofits the obtained data as the quantum of missing data (quantum of missing data 604) into the predicted pattern during the data outage as discussed above in connection with step 312.

In step 316, analyzer 101 re-runs analytics on the retrofitted quantum of missing data in the predicted pattern to identify anomalies during the data outage as discussed above in connection with step 313.

As a result of the present invention, anomalies may be detected during the data outage by retrofitting the quantum of missing data into the predicted pattern during the data outage thereby enabling the anomaly detection model to provide more accurate predictions of anomalies occurring during the data outage. Furthermore, false positives (falsely identifying an anomaly) are avoided when data connectivity resumes after a data outage.

Furthermore, the present invention improves the technology or technical field involving anomaly detection. As discussed above, anomaly detection is the process of identifying unexpected items or events in data sets, which differ from the norm. Three broad categories of anomaly detection techniques exist. Unsupervised anomaly detection techniques detect anomalies in an unlabeled test data set under the assumption that the majority of the instances in the data set are normal by looking for instances that seem to least fit the remainder of the data set. Supervised anomaly detection techniques require a data set that has been labeled as "normal" and "abnormal" and involves training a classifier. Semi-supervised anomaly detection techniques construct a model representing normal behavior from a given normal training data set, and then test the likelihood of a test instance to be generated by the learnt model using machine learning/artificial intelligence so as to form a prediction of an anomaly. Such machine learning/artificial intelligence models ("anomaly detection models") may be directly impacted on the quality of their prediction of an anomaly due to data outages, such as a network outage or the unavailability of a cloud solution. For instance, when there is a data outage, the anomaly detection model may no longer be able to determine the pattern of the data during the data outage, or alternatively, the pattern of the data during the data outage may be mispresented. In either case, the prediction of an anomaly made by the anomaly detection model will now be less accurate. For example, after connectivity is restored, the anomaly detection model may now receive aggregated energy usage data from the gateway during the data outage (e.g., eight hours). However, the pattern of data during the data outage is lost and, as a result, the anomalies that occurred during the data outage will be precluded from being identified. Furthermore, when connectivity is restored after a duration of time (e.g., hours, days, weeks), a surge of data may be received which may also impact the quality of the prediction made by the anomaly detection model, such as falsely identifying an anomaly after connectively is restored. As a result, there is not currently a means for accurately detecting anomalies in data, such as data from sensor readings, by an anomaly detection model during a data outage and upon restoration of connectivity.

The present invention improves such technology by building an anomaly detection using data received from a sensor at a characterized granularity. An object of a sensor is marked in a first state (e.g., "not available") if the data is not being received from the sensor at the required frequency. When such an event occurs, a data outage is said to occur. When data is subsequently received from the sensor at the required frequency, the object of the sensor is then marked in a second state (e.g., "available"). When such an event occurs (sensor becomes available again), a period of service is said to occur following the data outage. Once the period of service occurs, a quantum of missing during the data outage period is identified using predictive modeling if the data during the data outage is not available at the granularity in which the anomaly detection model is built. The identified quantum of missing data is retrofitted into a predicted pattern during the data outage and the analytics are then re-run on the retrofitted quantum of missing data in the predicted pattern to identify anomalies during the data outage. In this manner, anomalies in data, such as data from sensor readings, can be identified during the data outage thereby enabling the anomaly detection model to provide more accurate predictions of anomalies occurring during the data outage. Furthermore, the false detection of anomalies in the surge of data after the sensor becomes available again is avoided. Additionally, in this manner, there is an improvement in the technical field involving anomaly detection.

The technical solution provided by the present invention cannot be performed in the human mind or by a human using a pen and paper. That is, the technical solution provided by the present invention could not be accomplished in the human mind or by a human using a pen and paper in any reasonable amount of time and with any reasonable expectation of accuracy without the use of a computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for identifying anomalies in data during a data outage, the method comprising:
   building an anomaly detection model using data received from a sensor at a characterized granularity;
   marking said sensor as being in a first state in response to said data not being received from said sensor at a required frequency, wherein a period of time that said data is not being received from said sensor at said required frequency corresponds to a period of said data outage;
   marking said sensor as being in a second state after marking said sensor as being in said first state in response to said data being received from said sensor at said required frequency after said data not being received from said sensor at said required frequency, wherein a period of time that said data is being received from said sensor at said required frequency corresponds to a period of service following said data outage;
   identifying a quantum of missing data during said data outage using predictive modeling in response to data during said data outage not being available at a granularity in which said anomaly detection model is built;
   retrofitting said identified quantum of missing data into a predicted pattern during said data outage; and
   re-running analytics on said retrofitted quantum of missing data in said predicted pattern to identify anomalies during said data outage.

2. The method as recited in claim 1 further comprising:
   identifying a magnitude of a surge in data upon initiation of said period of service following said data outage.

3. The method as recited in claim 2 further comprising:
   retrofitting said identified quantum of missing data into said predicted pattern during said data outage using said magnitude of said surge in data upon initiation of said period of service following said data outage.

4. The method as recited in claim 1 further comprising:
   calculating an upper bound and a lower bound of a confidence interval for said identified quantum of missing data during said data outage.

5. The method as recited in claim 1 further comprising:
   obtaining said data during said data outage from a networking device in response to said data during said data outage being available at said granularity in which said anomaly detection model is built; and
   retrofitting said obtained data as said quantum of missing data into said predicted pattern during said data outage.

6. The method as recited in claim 1 further comprising:
   determining a frequency at which data is received from said sensor using historical data to form said required frequency for data to be received from said sensor;

characterizing a level of detail in said data received from said sensor using machine learning; and storing said characterized level of detail in said data in a knowledge graph.

7. The method as recited in claim 1, wherein said first state corresponds to a state of not being available for service during said data outage, wherein said second state corresponds to a state of being available for service during said period of service.

\* \* \* \* \*